US012416388B1

(12) United States Patent
Lin

(10) Patent No.: US 12,416,388 B1
(45) Date of Patent: Sep. 16, 2025

(54) SIMULATED CANDLE FLAME STRUCTURE OF ELECTRONIC CANDLE

(71) Applicant: XIAMEN WISDOM.LIGHT INDUSTRY & TRADE CO., LTD., FTZ Xiamen (CN)

(72) Inventor: Cheng-Yi Lin, FTZ Xiamen (CN)

(73) Assignee: XIAMEN WISDOM.LIGHT INDUSTRY & TRADE CO., LTD., Ftz Xiamen (CN)

( * ) Notice: Subject to any disclaimer, the term of this patent is extended or adjusted under 35 U.S.C. 154(b) by 0 days.

(21) Appl. No.: 18/979,631

(22) Filed: Dec. 13, 2024

(30) Foreign Application Priority Data

Aug. 20, 2024 (CN) ........................ 202422012455.7

(51) Int. Cl.
*F21S 6/00* (2006.01)
*F21S 10/04* (2006.01)
*F21V 9/08* (2018.01)

(52) U.S. Cl.
CPC ............... *F21S 6/001* (2013.01); *F21S 10/04* (2013.01); *F21V 9/08* (2013.01)

(58) Field of Classification Search
CPC .......... F21S 6/001; F21S 10/04; F21S 10/043; F21S 10/046
See application file for complete search history.

(56) References Cited

U.S. PATENT DOCUMENTS 12,215,839 B1 * 2/2025 She .......................... F21V 3/02
2008/0074875 A1 * 3/2008 Jensen .................... F21S 10/04 362/240
2012/0307517 A1 * 12/2012 Ding ....................... F21S 6/001 362/161
2014/0104820 A1 * 4/2014 Chiang .................. F21V 13/02 362/183
2015/0016086 A1 * 1/2015 Patton ..................... F21S 6/001 362/84
2019/0063703 A1 * 2/2019 Hurduc ................... F21V 14/06
2020/0208798 A1 * 7/2020 Patton ..................... F21S 6/001
2022/0341555 A1 * 10/2022 Sena ..................... F21S 10/046

FOREIGN PATENT DOCUMENTS

CA 3225541 A1 * 3/2024 .............. F21S 6/001
CN 106016027 A * 10/2016 ................ F21S 9/02
CN 107883332 A * 4/2018 .............. F21V 13/02
DE 202018104847 U1 * 9/2018 ............ F21S 10/043
DE 202023107607 U1 * 1/2024 .............. F21S 10/04

* cited by examiner

*Primary Examiner* — Alexander K Garlen
(74) *Attorney, Agent, or Firm* — Leong C. Lei

(57) ABSTRACT

A simulated candle flame structure of an electronic candle is provided. The electronic candle includes a candle body. A flame simulating board is mounted on a top end of the candle body. A light emitting element is arranged in the interior of the candle body. The light emitting element emits light toward the flame simulating board to be reflected thereby so as to simulate the appearance of a candle in burning. A wick flame pattern is provided on a bottom end of the flame simulating board. The wick flame pattern can be directly transfer-printed on the flame simulating board or is adhesively attached to the flame simulating board, so that the light from the light emitting element is reflected to demonstrate the appearance of a wick burning in a flame, thereby displaying a more realistic electronic candle.

5 Claims, 6 Drawing Sheets

SIMULATED CANDLE FLAME STRUCTURE OF ELECTRONIC CANDLE

BACKGROUND OF THE INVENTION

(a) Technical Field of the Invention

The present invention relates generally to an electronic candle, and more particularly to an electronic candle, which produces a visual sense of a candle wick in a simulated candle flame after being lit, so that the electronic candle has a more realistic effect in use.

(b) Description of the Prior Art

Candles produce lighting effects by burning their wicks, but because they use an open flame, they may ignite surrounding objects and cause accidents such as fires. For this reason, in recent years, electronic candles have been proposed, which use the projection of light to simulate the burning state of a candle. The electronic candles are reusable and do not produce smoke, and occurrence of accidents such as fires can be avoided because they do not use an open flame for burning.

An existing electronic candle, as shown in Taiwan Utility Model M474857 "Electronic Candle", comprises a hollow shell, a movable reflection plate assembly, a circuit board, and a light-emitting diode (LED) light. The hollow shell has an upper opening and a bottom surface opposite to the upper opening. The movable reflection plate assembly comprises a suspension rod and a reflection plate, wherein two ends of the suspension rod are connected to inner walls of the hollow shell. The reflection plate is suspended from the suspension rod and has a reflective end protruding out of the upper opening and a magnetic induction end opposite to the reflective end. A coil is provided on the circuit board, and the coil generates a time-varying magnetic field. The LED light is electrically connected to the circuit board, and a light-emitting surface of the LED light faces the reflective end. When the electronic candle of this Utility Model is operating, the magnetic induction end will be pushed by the time-varying magnetic field, causing the reflection plate to sway to thereby simulate a swaying effect of a candle.

The reflection plate disclosed in the above-mentioned prior art is a pure white reflection plate, which is capable of reflecting light from the LED light and producing a flame effect, yet when the candle burns, the bottom of the flame is burning upward from the periphery of a wick. The existing electronic candle operates by simply reflecting the light from the LED light and cannot simulate the effect of the flame burning upward from the candle wick. Therefore, it cannot simulate the burning state of a real candle, and further improvement is necessary.

The inventor of the present invention performed research and innovation to provide the simulated candle flame structure of the electronic candle described in the present invention.

SUMMARY OF THE INVENTION

An objective of the present invention is to provide a simulated candle flame structure of an electronic candle, wherein the electronic candle comprises a candle body, a flame simulating board being mounted on a top end of the candle body, a light emitting element being arranged in an interior of the candle body, wherein the light emitting element is operable to emit light toward the flame simulating board to be reflected thereby for simulating an appearance of a candle burning, wherein the flame simulating board has a board surface on which a wick flame pattern is formed, the wick flame pattern being directly printed or painted on the flame simulating board or adhesively attached to the flame simulating board.

In the simulated candle flame structure of the electronic candle disclosed in the present, the flame simulating board comprises a flame color gradient area on a periphery thereof, and the flame color gradient area gradually becomes lighter and brighter from the periphery toward a center.

In the simulated candle flame structure of the electronic candle disclosed in the present, the flame color gradient area and the wick flame pattern are printed on a sticker that is pasted on the flame simulating board.

In the simulated candle flame structure of the electronic candle disclosed in the present, the flame color gradient area and the wick flame pattern are directly printed or painted on the flame simulating board.

In the simulated candle flame structure of the electronic candle disclosed in the present, a color of the wick flame pattern gradually becomes lighter and brighter from bottom to top.

In the simulated candle flame structure of the electronic candle disclosed in the present, the flame simulating board comprises a plate having a curved surface or a flat plate, the present invention is not limited thereto.

The desirable entities disclosed in the present invention can be clearly understood from the following description and drawings.

DETAILED DESCRIPTION OF THE PREFERRED EMBODIMENTS

Figure 1:
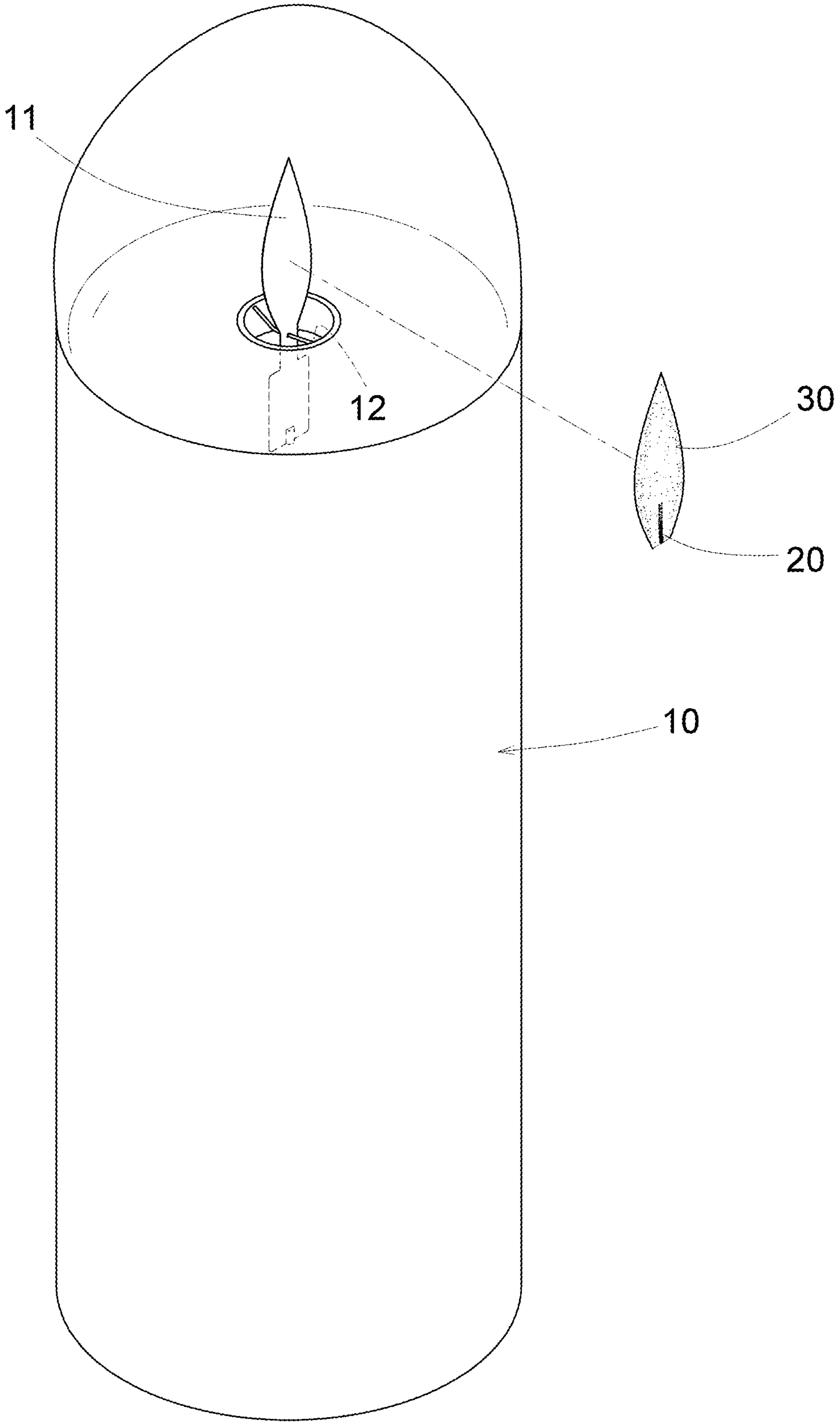
FIG. 1 is a schematic exploded view showing the present invention adhesively attached to a flame simulating board.

As shown in FIGS. 1-4, the present invention relates to a simulated candle flame structure of an electronic candle. The electronic candle comprises a candle body 10. A flame simulating board 11 is mounted on a top end of the candle body 10, and a light emitting element 12 is mounted in an interior of the candle body 10. The light emitting element 12 emits light projecting toward the flame simulating board 11 to be reflected thereby so as to simulate the appearance of a candle burning. The above-described structure is known in the prior art and has been commonly used in the structures of electronic candles, such as that shown in Taiwan Utility Model M474957, and is not a novel part of the present invention, and no further details will be described herein.

The simulated candle flame structure of the electronic candle according to the present invention features that a wick flame pattern 20 is provided on a board surface of the flame simulating board 11. The wick flame pattern 20 can be directly printed or coated on the flame simulating board 11 or can be printed on a sticker that is attached on the flame simulating board 11. The present invention does not impose any constraint to how the wick flame pattern 20 is arranged on the flame simulating board 11.

In the simulated candle flame structure of the electronic candle according to the present invention, the flame simulating board 11 further comprises a flame color gradient area 30 arranged on a periphery thereof. The flame color gradient area 30 gradually becomes lighter and brighter from the periphery of the flame simulating board 11 toward the center. The flame color gradient area 30 can exhibits a gradient color from red to white or bright yellow towards the center, or a gradient color from orange red to white or bright yellow towards the center, but the present invention is not limited thereto.

Figure 4:
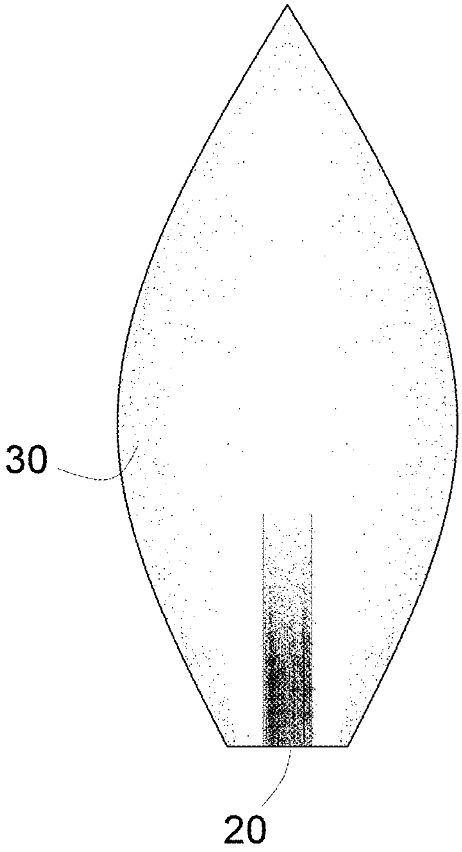
FIG. 4 is a schematic view showing a wick flame pattern and a flame color gradient area printed on a sticker according to the present invention.

In the simulated candle flame structure of the electronic candle according to the present invention, the flame color gradient area 30 and the wick flame pattern 20 can be printed on a sticker and pasted on the flame simulating board 11, as shown in FIG. 4; or alternatively, the flame color gradient area 30 and the wick flame pattern 20 are directly printed or painted on the flame simulating board 11, and the present invention is not limited thereto.

Figure 3:
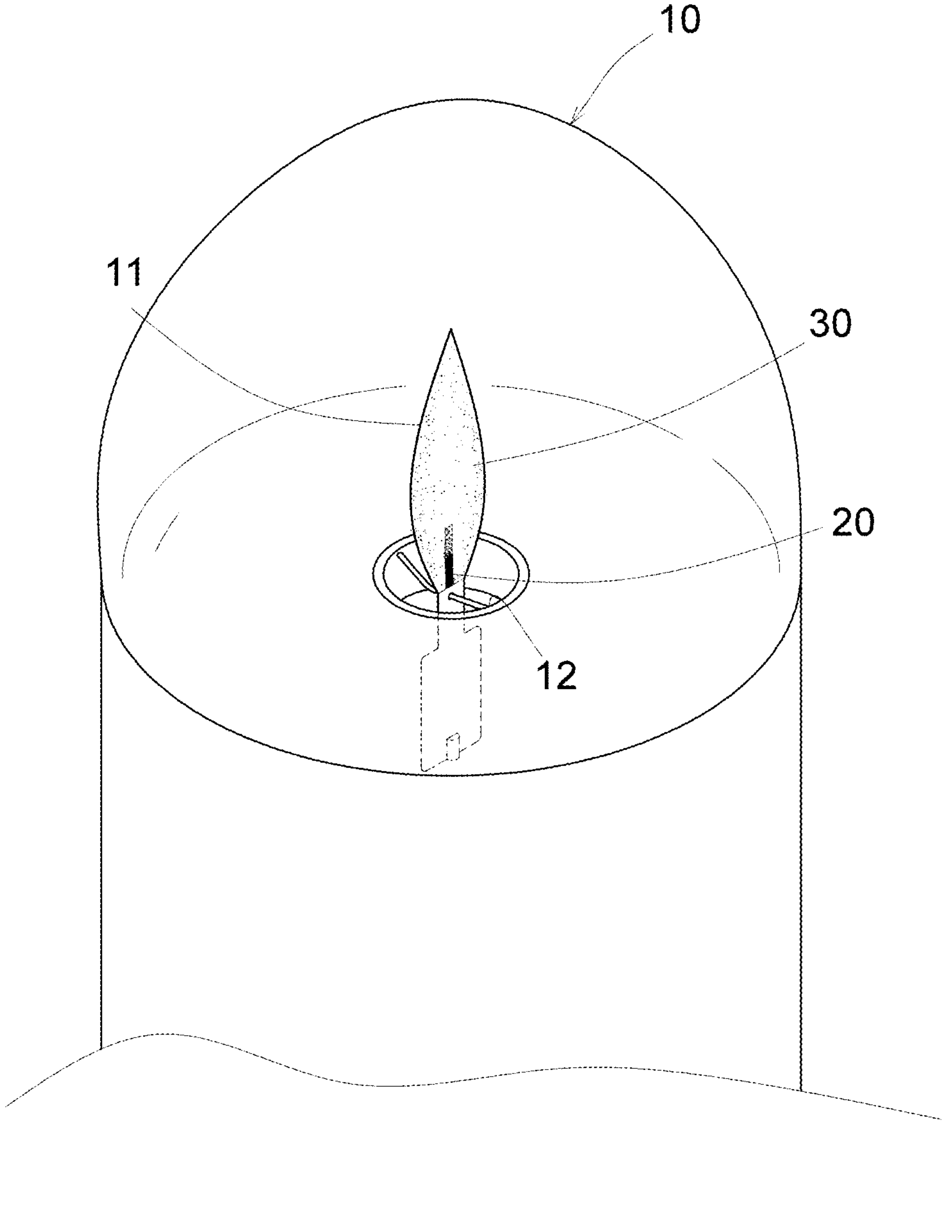
FIG. 3 is a partial enlarged view of FIG. 2.

As shown in FIGS. 3 and 4, in the simulated candle flame structure of the electronic candle according to the present invention, the color of the wick flame pattern 20 gradually becomes lighter and brighter from the bottom to the top. The wick flame pattern 20 can be black or brown and gradually fade upward to white or bright yellow to present a realistic appearance of a burning candle wick.

In the simulated candle flame structure of the electronic candle according to the present invention, the flame simulating board 11 can be a curved plate, which focuses light toward the center, or the flame simulating board 11 can be a flat plate, and the present invention is not limited thereto.

Figure 2:
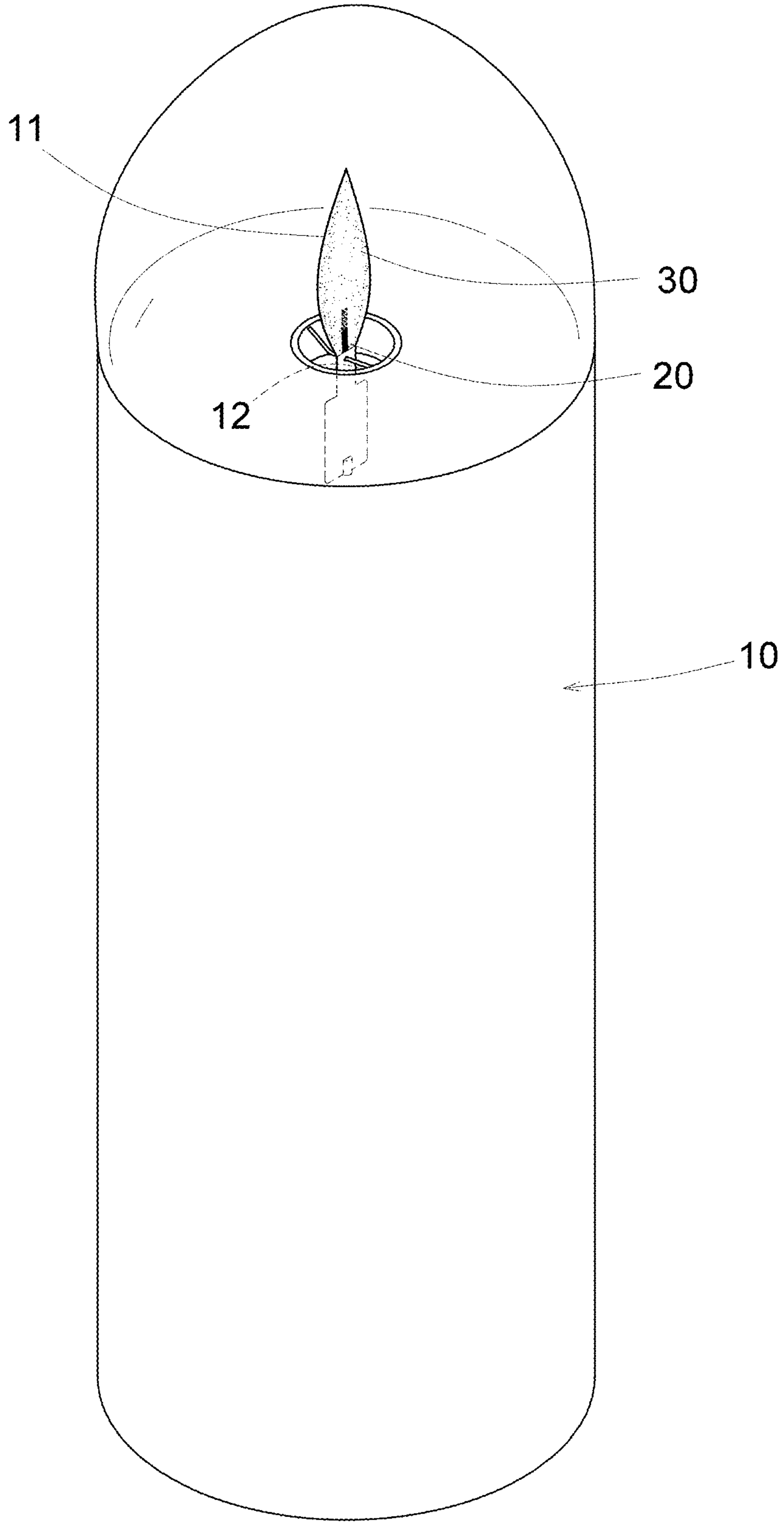
FIG. 2 is a schematic perspective view of FIG. 1 in an assembled form.
Figure 5:
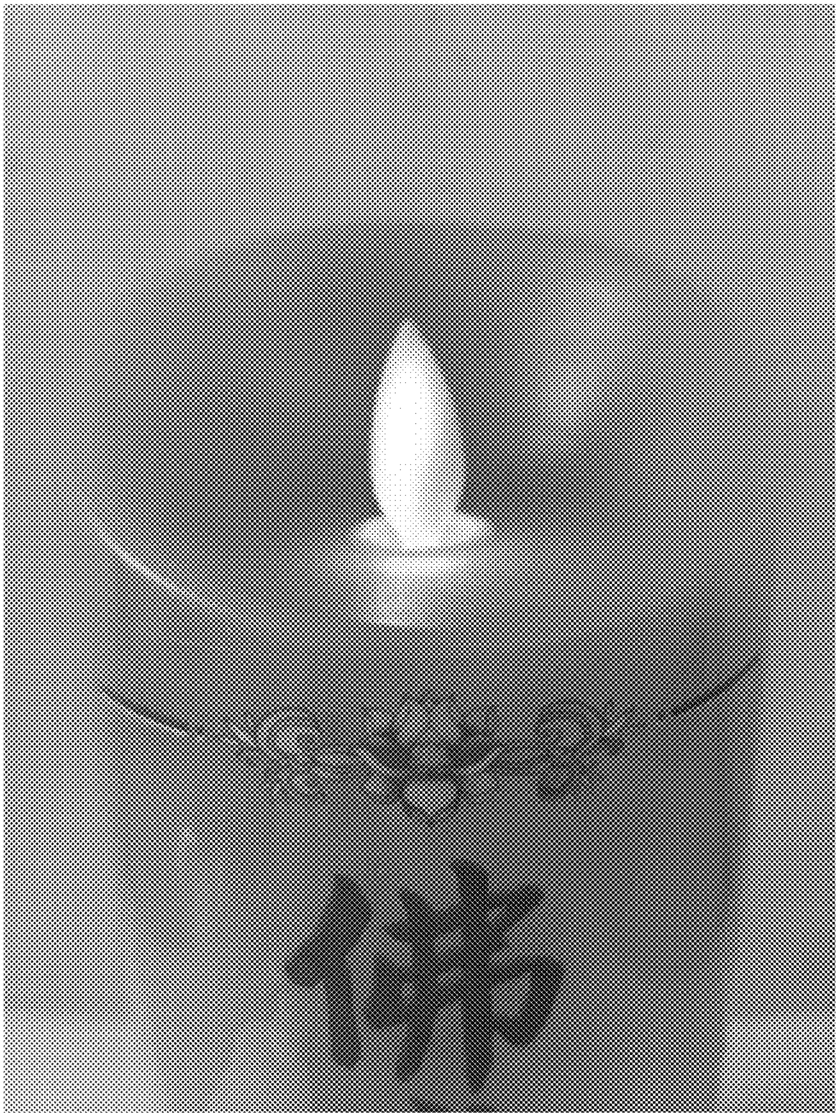
FIG. 5 PRIOR ART
FIG. 5 is a schematic view showing a use of a known electronic candle.
Figure 6:
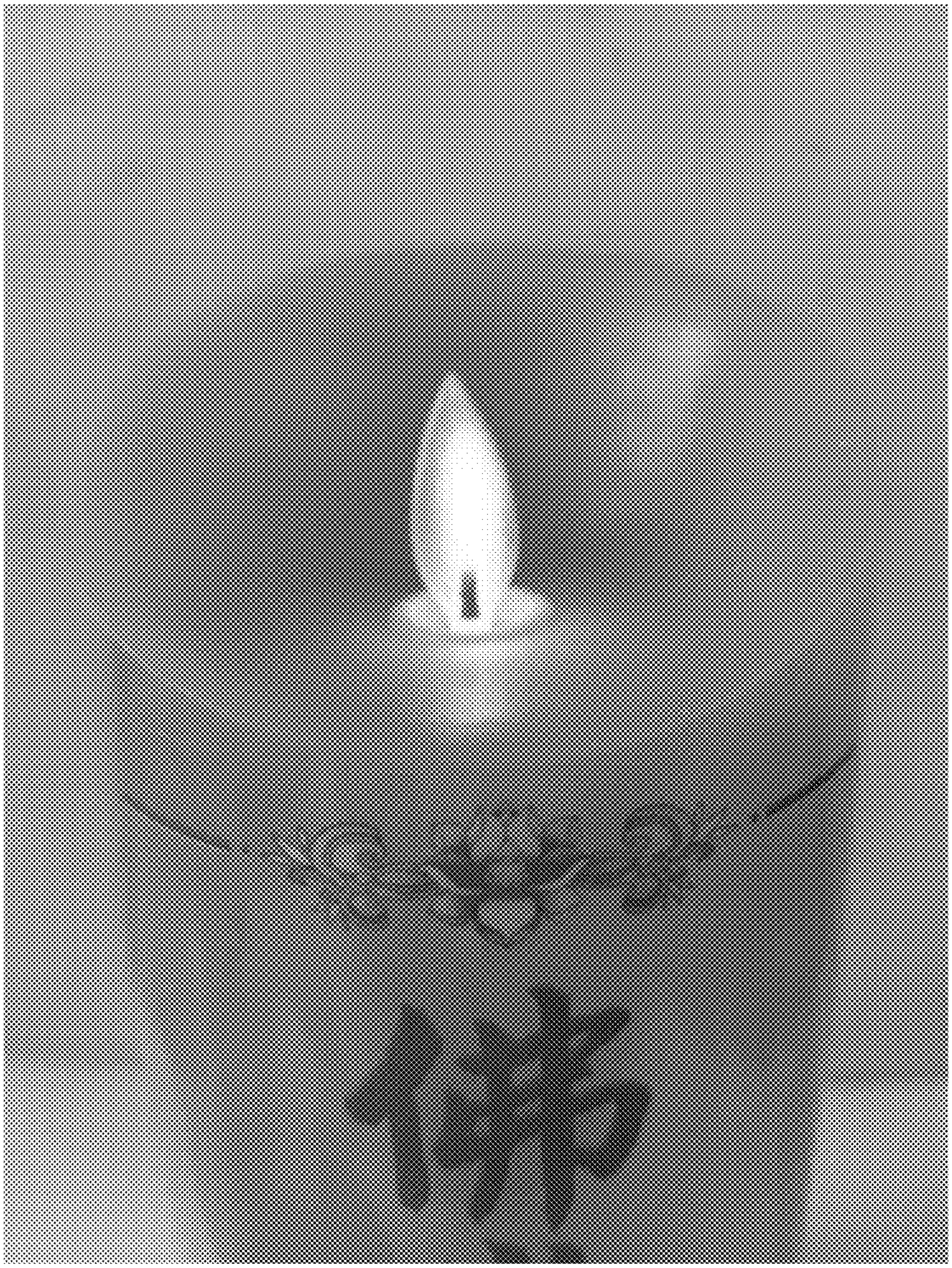
FIG. 6 is a schematic view showing a use of the present invention.

As shown in FIGS. 2 and 3, when light emitting from a light source toward the flame simulating board 11 described in the present invention, the wick flame pattern 20 is shown and highlighted. Further, the flame color gradient area 30 on the periphery of the wick flame pattern 20 also helps make the periphery darker than the center, thus producing the appearance of a real candle in burning. Referring to FIG. 5, which is a photo showing a use of an existing electronic candle, the existing electronic candle uses pure white color to form a flame simulating board, which shows only flame without exhibiting a "wick". Oppositely, referring to FIGS. 4 and 6, wherein FIG. 6 is a photo showing a use of the present invention, when the present invention projects light to the flame simulating board, the light highlights the wick flame pattern 20, and the flame color gradient area 30 on the periphery of the wick flame pattern 20 also makes the periphery darker than the center of the flame simulating board, thereby producing the appearance of a real candle in burning, so that the electronic candle according to the present invention can better simulate the lighting state of a real candle, thereby demonstrating the novelty and excellence of the present invention.

I claim:

1. A simulated candle flame structure of an electronic candle, the electronic candle comprising a candle body, a flame simulating board being mounted on a top end of the candle body, a light emitting element being arranged in an interior of the candle body, wherein the light emitting element is operable to emit light toward the flame simulating board to be reflected thereby for simulating an appearance of a candle burning, wherein the flame simulating board has a board surface on which a wick flame pattern is formed, the wick flame pattern being directly printed or painted on the flame simulating board or adhesively attached to the flame simulating board; wherein the flame simulating board comprises a flame color gradient area on a periphery thereof, the flame color gradient area gradually becomes lighter and brighter from the periphery toward a center, and a color of the wick flame pattern gradually becomes lighter and brighter from bottom to top.

2. The simulated candle flame structure of the electronic candle according to claim 1, wherein the flame color gradient area and the wick flame pattern are printed on a sticker that is pasted on the flame simulating board.

3. The simulated candle flame structure of the electronic candle according to claim 1, wherein the flame color gradient area and the wick flame pattern are directly printed or painted on the flame simulating board.

4. The simulated candle flame structure of the electronic candle according to claim 1, wherein the flame simulating board comprises a plate having a curved surface.

5. The simulated candle flame structure of the electronic candle according to claim 1, wherein the flame simulating board comprises a flat plate.

* * * * *